(12) United States Patent
Coffin

(10) Patent No.: US 8,875,378 B2
(45) Date of Patent: Nov. 4, 2014

(54) TIE BOLT EMPLOYING DIFFERENTIAL THREAD

(75) Inventor: James B. Coffin, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 274 days.

(21) Appl. No.: 13/290,370

(22) Filed: Nov. 7, 2011

(65) Prior Publication Data

US 2013/0111735 A1    May 9, 2013

(51) Int. Cl.
| | |
|---|---|
| B23P 11/00 | (2006.01) |
| F16B 35/00 | (2006.01) |
| F16B 35/04 | (2006.01) |
| F16D 1/00 | (2006.01) |
| F01D 5/02 | (2006.01) |

(52) U.S. Cl.
CPC ..................... F01D 5/026 (2013.01)
USPC ............. 29/525.11; 29/525.01; 403/299; 411/389; 411/413; 411/412; 416/198 R; 416/204 R

(58) Field of Classification Search
USPC ....... 29/525.01, 525.11; 403/299; 416/204 R, 416/244 A, 198 A, 198 R; 411/388, 389, 395, 411/412, 413
See application file for complete search history.

(56) References Cited

U.S. PATENT DOCUMENTS

| | | | | |
|---|---|---|---|---|
| 3,602,535 | A * | 8/1971 | Behning et al. | 403/118 |
| 3,631,688 | A * | 1/1972 | Quick | 464/182 |
| 3,970,398 | A * | 7/1976 | Wilson | 403/26 |
| 5,537,814 | A * | 7/1996 | Nastuk et al. | 60/796 |
| 6,276,124 | B1 * | 8/2001 | Soh et al. | 60/805 |
| 7,452,188 | B2 * | 11/2008 | Bouchard | 416/204 R |
| 7,811,052 | B2 * | 10/2010 | Guihard et al. | 415/122.1 |
| 7,870,744 | B2 * | 1/2011 | Galivel et al. | 60/792 |
| 2007/0212226 | A1 * | 9/2007 | Guihard et al. | 416/244 A |
| 2010/0247234 | A1 * | 9/2010 | Closs | 403/299 |

* cited by examiner

*Primary Examiner* — Essama Omgba
(74) *Attorney, Agent, or Firm* — Bachman & LaPointe, P.C.

(57) ABSTRACT

A tie bolt for joining two parts together has a shaft. The shaft in turn has a primary thread for engaging a first part and a secondary thread for engaging a second part, wherein the primary thread and the secondary thread have different pitches. The tie bolt may be used to join together any two parts which are to be locked together to transmit torque.

4 Claims, 2 Drawing Sheets

TIE BOLT EMPLOYING DIFFERENTIAL THREAD

BACKGROUND

The present disclosure relates to a tie bolt for engaging two parts, such as two shafts of a gas turbine engine, which tie bolt has two different threads.

Referring to FIG. 1, there is shown an axial load bearing surface 10 of a tie bolt 12 which is used to join together two parts, such as a forward shaft 14 and an aft shaft 16. The axial load bearing surface 10 requires a radial height 18 that limits the minimum bore 20 of another part 22 and also limits the size of a corner fillet 24. Friction of the axial load bearing surface 10 increases the assembly torque required to achieve a desired tensile preload.

The assembly torque advances the tie bolt 12, clamping the forward shaft 14 between the axial load bearing surface 10 and the aft shaft 16 via the primary thread 26.

It may be advantageous if the axial load bearing surface 10 can be eliminated. This may result in a reduction in the radial size of the tie bolt as well as removal of the friction of the axial load bearing surface from the installation torque procedure.

SUMMARY

In accordance with the present disclosure, there is provided a tie bolt for joining two parts together which broadly comprises a shaft having a primary thread for engaging a first part and a secondary thread for engaging a second part, wherein said primary thread and said secondary thread have different pitches.

Further in accordance with the present invention, there is provided a system for joining parts which broadly comprises a tie bolt having a shaft with a primary thread at one end of said shaft and a secondary thread at an opposite end of said shaft, wherein the primary and secondary threads have different pitches.

Still further, there is provided a method for joining two parts together which broadly comprises providing a tie bolt having a shaft with a primary thread at one end of said shaft and a secondary thread at an opposite end of said shaft, wherein the primary and secondary threads have different pitches, engaging a first part with said primary thread and engaging a second part with said secondary thread.

Other details of the tie bolt employing differential thread are set forth in the following description and the accompanying drawings wherein like reference numerals depict like elements.

DETAILED DESCRIPTION

Figure 2:
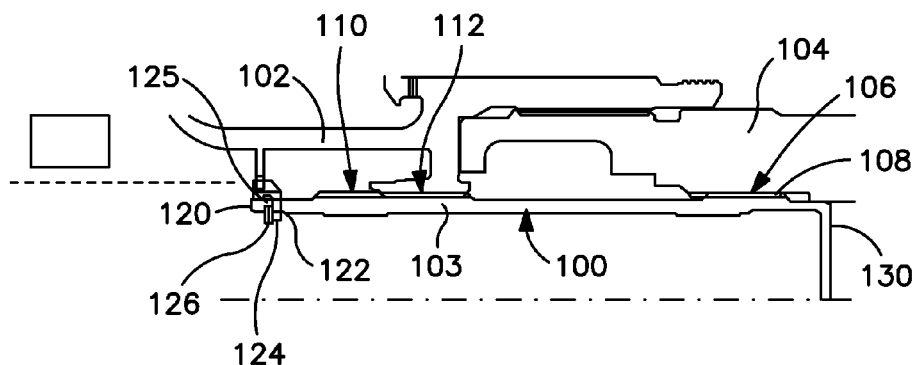
FIG. 2 illustrates a tie bolt having differential threads.

Referring now to FIG. 2, there is shown an embodiment of a tie bolt 100 which can be used in a gas turbine engine in accordance with the present disclosure. The tie bolt 100 can be used to join any two parts 102 and 104 together. The part 102 may be a forward shaft and the part 104 may be an aft shaft which shafts are locked together in order to transmit a torque. For example, the shaft 102 could be an FDGS input coupling shaft and the shaft 104 may be a LP turbine shaft/LP compressor hub sub-assembly.

The tie bolt 100 may be formed from any suitable material known in the art, such as high strength steel, nickel or a nickel alloy, or a titanium alloy.

The tie bolt 100 has a shaft 103 on which there is a primary thread 106, which engages a mating thread 108 on the part 104, and a secondary thread 110, which engages a thread 112 on the part 102. The secondary thread 110 is provided with a different pitch than the primary thread 106. The pitches of the primary and secondary threads 106 and 110 respectively are selected to create an effective pitch for the tie bolt 100 relative to the two parts 102 and 104 that is finer than either the primary or secondary thread pitches. In one embodiment, the pitch of the primary thread is coarse while the pitch of the secondary thread is fine.

Figure 3:
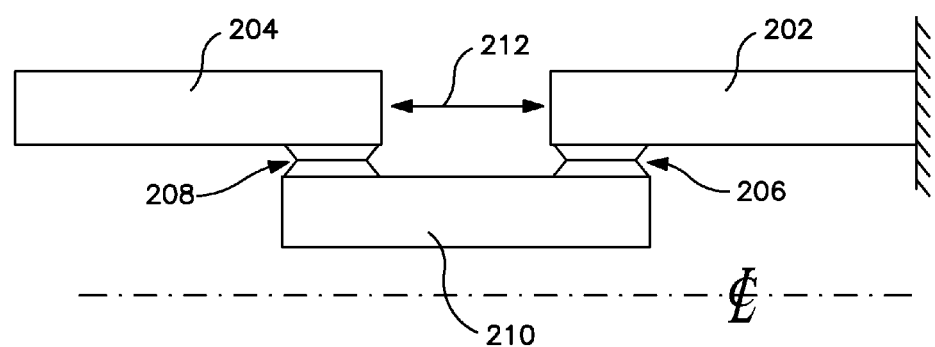
FIG. 3 is a diagrammatic representation of effective pitch.

FIG. 3 illustrates the concept of effective pitch. As can be seen in the drawing, there is a first shaft 202 and a second shaft 204. The shaft 202 is fixed to ground. Preferably, the shaft 202 is splined or keyed to shaft 204, so there is no relative rotation between shafts 202 and 204. For exemplary purposes, the pitch 206 is 10 TPI (threads per inch) and the pitch 208 is 14 TPI. For every clockwise turn of the bolt 210, the bolt advances $1/10$ inches (1/25.4 cm) relative to shaft 202. For every clockwise turn of the bolt 210, the bolt advances $1/14$ inches (1/35.6 cm) relative to shaft 204. For every clockwise turn of the bolt 210, the shaft 204 advances ($1/10$-$1/14$) inches relative to the shaft 202. So for every clockwise turn of the bolt 210, the gap 212 closes ($1/10$-$1/14$) inches which equals $1/35$ or 0.02857 inches (0.07257 cm). The effective pitch is the inverse of the gap closure (1/0.02857). Thus, in this case, the effective pitch is 35. The Gain is 2.5 (35/14). The Gain is a measure of the mechanical advantage provided by the device. By adjusting the pitches 206 and 208, the Gain may be manipulated to give any desired value. The practical range of the Gain will depend on practical limitations of space and thread manufacturing.

As shown in FIG. 2, the tie bolt 100 has an end 120 of the shaft 103 which fits into a slot 122 in a tab 124 connected to the part 102. The end 120 may be provided with a groove 125 into which a locking element 126 may be inserted. The locking element 126 is held in place by a surface of the tab 124 and an end wall of the groove 125. The shaft 103 may have a substantially constant diameter. Further, as shown in FIG. 2, the shaft 103 has an end 130, opposed to the end 120, which is substantially L-shaped to seal off the forward end from the aft end. If desired, the substantially L-shape end could be omitted and the end 120 could have some other shape.

During installation, the tie bolt 100 may be rotated using any suitable tool known in the art. Rotation of the tie bolt 100 causes the parts 102 and 104 to come together. When the parts 102 and 104 abut each other, rotation of the tie bolt may cease.

Figure 1:
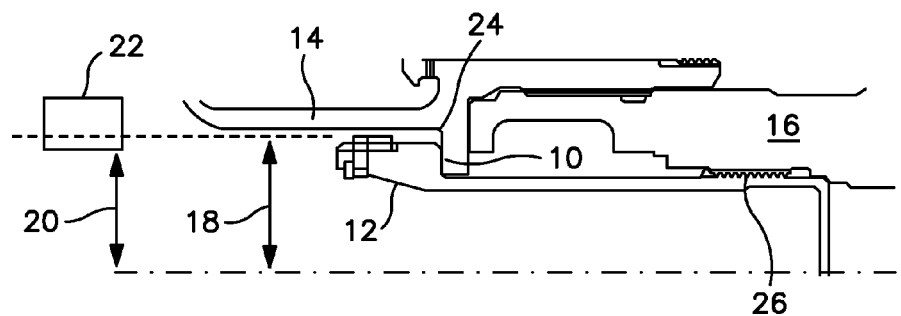
FIG. 1 is a schematic diagram of a prior art tie bolt used in a prior installation.

The tie bolt 100 with the differential thread described herein has a number of benefits. For example, as can be seen from FIGS. 1 and 2, the radial size of the tie bolt can be reduced. Further, the friction of the axial load bearing surface is eliminated. Still further, it is not required to prestretch the tie bolt prior to torqueing. The mechanical advantage of the differential thread results in a dramatically reduced wrenching torque for a given preload, thus improving assembly, tooling design, and assembly ergonomics/safety. The high effective pitch allows for fine adjustment of angle of turn to achieve a more accurate preload. The differential thread disassembles itself when untorqued. No pushing or pulling tool is required.

There has been provided in the present disclosure a tie bolt employing differential thread. While the tie bolt has been described in the context of a particular embodiment thereof, other unforeseen alternatives, modifications, and variations may become apparent to those skilled in the art having read the foregoing description. Accordingly, it is intended to embrace those alternatives, modifications, and variations, as fall within the broad scope of the appended claims.

What is claimed is:

1. A method for joining two parts together comprising:
providing a tie bolt having a shaft with a primary thread at one end of said shaft and a secondary thread at an opposite end of said shaft, wherein the primary and secondary threads have different pitches;
engaging a first part with said primary thread; and
engaging a second part with said secondary thread, wherein said second part has a tab attached thereto with a slot in said tab and one end of said shaft engages said slot.

2. The method of claim 1, further comprising rotating said tie bolt to cause said first and second parts to move towards each other.

3. The method of claim 1, wherein said providing step comprises providing the primary thread with a pitch which is a coarse and a secondary thread with a pitch which is finer in comparison to the pitch of the primary thread.

4. The method of claim 1, further comprising achieving an effective pitch relative to the two parts that is finer than either the primary or secondary thread pitches.

* * * * *